(12) United States Patent
Hansen et al.

(10) Patent No.: US 12,471,764 B2
(45) Date of Patent: Nov. 18, 2025

(54) ENDOSCOPE WITH AN ARTICULATED BENDING SECTION BODY

(71) Applicant: AMBU A/S, Ballerup (DK)

(72) Inventors: Frederik Hansen, Copenhagen (DK); Kaspar Mat Matthison-Hansen, Helsingør (DK)

(73) Assignee: AMBU A/S, Ballerup (DK)

( * ) Notice: Subject to any disclaimer, the term of this patent is extended or adjusted under 35 U.S.C. 154(b) by 124 days.

(21) Appl. No.: 17/578,770

(22) Filed: Jan. 19, 2022

(65) Prior Publication Data

US 2022/0233054 A1  Jul. 28, 2022

(30) Foreign Application Priority Data

Jan. 28, 2021 (EP) .................................. 21154059

(51) Int. Cl.
 *A61B 1/008* (2006.01)
 *A61B 1/00* (2006.01)
 *A61B 1/005* (2006.01)

(52) U.S. Cl.
 CPC .......... *A61B 1/0055* (2013.01); *A61B 1/0057* (2013.01); *A61B 1/008* (2013.01)

(58) Field of Classification Search
 CPC ... A61B 1/0057; A61B 1/0055; A61B 1/0045; A61B 1/0016; A61B 1/005; A61B 1/0051; A61B 1/0052; A61B 1/0053; A61B 1/0056; A61B 1/0058; A61B 1/008; A61B 2017/003; A61B 2017/00305; A61B 2017/00309; A61B 2017/00314; A61B 2017/00318; A61B 2017/00323; A61B 2017/00327; A61M 25/0133; A61M 25/0136; A61M 25/0138; A61M 25/0141; A61M 25/0144; A61M 25/0147

See application file for complete search history.

(56) References Cited

U.S. PATENT DOCUMENTS

| | | |
|---|---|---|
| 3,625,200 A | 12/1971 | Muller |
| 4,700,693 A | 10/1987 | Lia et al. |
| 4,748,969 A | 6/1988 | Wardle |
| 4,796,607 A | 1/1989 | Allred et al. |

(Continued)

FOREIGN PATENT DOCUMENTS

| | | |
|---|---|---|
| CN | 101048102 A | 10/2007 |
| CN | 110420006 A | 11/2019 |

(Continued)

*Primary Examiner* — Ryan N Henderson
(74) *Attorney, Agent, or Firm* — Faegre Drinker Biddle & Reath LLP (57) ABSTRACT

An endoscope having an articulated bending section body including a number of segments, the segments having a central passage adapted in cross-sectional shape to receive and support the exterior surface of a bendable tubular member providing a working channel of the endoscope. The cross-sectional shape includes a number of sectors of a circular periphery having a shared center and the same radius, the total length of said sectors being longer than half of said circular periphery, so as to provide said support for the exterior of the bendable tubular member providing the working channel of the endoscope. The cross-sectional shape includes at least one outwardly extending lobe in which a coil spring is accommodated.

27 Claims, 6 Drawing Sheets

(56) References Cited

U.S. PATENT DOCUMENTS

| | | |
|---|---|---|
| 5,325,845 A | 7/1994 | Adair |
| 5,381,782 A | 1/1995 | DeLaRama et al. |
| 5,938,588 A | 8/1999 | Grabover et al. |
| 7,413,543 B2 | 8/2008 | Banik et al. |
| 7,591,783 B2 | 9/2009 | Boulais et al. |
| 8,790,250 B2 | 7/2014 | Petersen et al. |
| 9,125,582 B2 | 9/2015 | Petersen |
| 9,172,227 B2 * | 10/2015 | Kitagawa ............. H02G 3/04 |
| 9,174,022 B2 | 11/2015 | Uihlein |
| 9,220,400 B2 | 12/2015 | Petersen |
| 9,486,595 B2 | 11/2016 | Borrye et al. |
| 9,622,649 B2 | 4/2017 | Lin |
| 10,321,804 B2 | 6/2019 | Jacobsen et al. |
| 2003/0040657 A1 | 2/2003 | Yamaya et al. |
| 2004/0199052 A1 | 10/2004 | Banik et al. |
| 2004/0242963 A1 | 12/2004 | Matsumoto et al. |
| 2004/0242966 A1 | 12/2004 | Barry et al. |
| 2005/0131279 A1 * | 6/2005 | Boulais ............. A61B 1/0016 600/141 |
| 2005/0273085 A1 | 12/2005 | Hinman et al. |
| 2007/0149852 A1 * | 6/2007 | Noguchi ........... A61B 1/00147 600/152 |
| 2008/0287736 A1 * | 11/2008 | Yamazaki ........... A61B 1/0057 600/118 |
| 2009/0163917 A1 | 6/2009 | Potter |
| 2012/0296167 A1 | 11/2012 | Chen et al. |
| 2013/0041223 A1 | 2/2013 | Kato |
| 2013/0041314 A1 | 2/2013 | Dillon |
| 2013/0261396 A1 * | 10/2013 | Boulais ............. A61B 1/00011 600/142 |
| 2014/0187894 A1 | 7/2014 | Bui et al. |
| 2014/0243592 A1 | 8/2014 | Kato et al. |
| 2015/0359416 A1 * | 12/2015 | Simchony ........... A61B 1/0055 600/110 |
| 2015/0366436 A1 | 12/2015 | Iuel |
| 2016/0101254 A1 | 4/2016 | Hansen et al. |
| 2017/0266410 A1 | 9/2017 | Farrell et al. |
| 2018/0228346 A1 | 8/2018 | Sekowski et al. |
| 2018/0289242 A1 | 10/2018 | Dai |
| 2019/0167070 A1 | 6/2019 | Ide |
| 2019/0175875 A1 | 6/2019 | Mirzalou et al. |
| 2019/0254504 A1 | 8/2019 | Ide |
| 2019/0388163 A1 | 12/2019 | Kim et al. |
| 2020/0016370 A1 | 1/2020 | Sasaki et al. |
| 2020/0046209 A1 | 2/2020 | Fancher |
| 2020/0100648 A1 | 4/2020 | Jensen |
| 2020/0113412 A1 | 4/2020 | Jensen |
| 2020/0138268 A1 | 5/2020 | Matthison-Hansen et al. |
| 2020/0196835 A1 | 6/2020 | Qvist et al. |
| 2020/0229680 A1 | 7/2020 | Matthison-Hansen et al. |
| 2021/0137354 A1 | 5/2021 | Bob et al. |
| 2021/0146096 A1 | 5/2021 | Yamada et al. |
| 2021/0219818 A1 | 7/2021 | Oyama |
| 2021/0393113 A1 | 12/2021 | Matthison-Hansen |
| 2023/0128263 A1 * | 4/2023 | Major ............... A61M 25/0147 606/130 |

FOREIGN PATENT DOCUMENTS

| | | |
|---|---|---|
| DE | 4102211 A1 | 8/1991 |
| EP | 3636133 A1 | 4/2020 |
| EP | 3669744 A1 | 6/2020 |
| WO | 2014/106511 A1 | 7/2014 |

\* cited by examiner

ENDOSCOPE WITH AN ARTICULATED BENDING SECTION BODY

CROSS-REFERENCE TO RELATED APPLICATIONS

This application claims priority from and the benefit of European Patent Application No. EP21154059.6, filed Jan. 28, 2021, which is incorporated herein by reference in its entirety.

TECHNICAL FIELD

The present disclosure relates to insertion endoscopes, in particular to the articulated bending section of such an endoscope.

BACKGROUND

Insertion endoscopes typically comprise a handle at the proximal end to be gripped by an operator and a flexible elongated insertion cord terminated at the distal end in a tip part at the end of a highly bendable, e.g. articulated, bending section, controllable by the operator. The tip part normally comprises a visual inspection means such as a camera, and illumination means such as LED's or exit apertures of light fibres and whatever optics is needed in that connection. Electrical wiring for the camera and other electronics such as the LED lighting run along the inside of the elongated insertion cord from the handle to the tip at the distal end. When, as mentioned, the illumination is instead fibre-optic, the optical fibres run along inside of the elongated insertion cord.

Thus, the controllable bending section is normally an articulated section at the distal tip of the elongated insertion cord that can be controlled by the operator via control knobs arranged on the handle. Typically, this control is effected by tensioning or slacking pull wires also running along the inside of the elongated insertion cord from the articulated tip part to a control mechanism of the handle. Furthermore, a working channel may run along the inside of the elongated insertion cord from the handle to the tip, e.g. allowing liquid to be removed from the body cavity or allowing the insertion of surgical instruments or the like into the body cavity.

Thus, using the controls allows the operator to advance the distal tip of the endoscope to a desired location by means of a series of actions involving inter alia bending the bending section in a desired direction, advancing the elongated insertion cord and turning the elongated insertion cord by turning the handle which is rigidly connected thereto. Navigating a tortuous path of bends and turns to a location of interest may subject the elongated insertion cord including the distal controllable bending section to substantial forces including compression, torsion, and bending. The main body of the elongated insertion cord is essentially only bendable enough to follow the direction taken by the articulated bending section. In fact, it could be said that it is an essential part of the purpose of the elongated insertion cord to transmit the longitudinal pushing forces and rotary torsional forces from the handle to the distal end of the elongated insertion cord in order to allow these maneuvers.

It is well known to provide the articulated bending section using a moulded single-piece bending section body comprising a distal end segment forming the tip part of the endoscope for accommodating the camera etc. as explained initially, a proximal end segment for connection to the elongated insertion cord body, and a number of more or less identical articulated intermediate segments. The single piece bending section body is a generally elongate cylindrical member, i.e. cylindrical save for the cut-outs between the segments allowing the bending section to bend. In other words, geometrically seen the cylindrical outer surfaces of the segments share the same cylindrical envelope. An example of such a moulded single-piece bending section body is found in commonly-owned U.S. Pat. No. 10,321,804, incorporated herein by reference.

The articulation of the segments, including the proximal end segment, the intermediate segments and the distal end segment is provided by hinge members, in WO2014/106511 formed as foil hinges between segments, a foil hinge being a short strip of material so thin that it allows the material to bend in an elastic manner between two segments.

In U.S. Pat. No. 10,321,804 the foil hinges between adjacent segments are split in three across the diameter of the generally cylindrical bending section body, one somewhat centrally arranged hinge part and two peripheral hinge parts diametrically opposite each other close to the external periphery of the geometrical envelope of the bending section body. The somewhat centrally arranged hinge part together with one of the peripheral hinge parts, abut and supports an inner tube forming the working channel against kinking between the segments.

The moulded single-piece bending section body of U.S. Pat. No. 10,321,804 has shown quite successful in practice. It has been found that some improvements with respect to the above-mentioned rotary torsional forces may be possible. In this respect, the centrally arranged hinge part only has a relatively smaller effect on the resistance to torsion, as the majority of the torsional forces are being taken up by the peripheral hinge parts. Moreover, having a centrally arranged hinge part will inevitably limit the maximum possible diameter of a tube forming the working channel.

In respect of the above, commonly-owned US Publication No. 2021/0393113, incorporated herein by reference, suggest a bending section body with a single but large central passage. The passage has an irregular cross-section with a generally circular part and a number of lobes. When a matching tube forming the working cannel of the endoscope is inserted in the generally circular central part, the lobes provide separate passages for inter alia pull-wires or the like. From a manufacturing perspective this is a desirable solution, because the bending section body can be moulded using only a single axially retractable large core. That is to say, long thin and delicate cores for separate pull wire passages can be avoided in the mould for the injection moulding process. As an example, in some embodiments the articulated bending section body is up to some 50 mm to 60 mm long and less than 2.8 mm in diameter. The pull-wires would typically be 0.18 mm in diameter. That is to say, if separate passages are to be provided in an insertion moulded bending section body, the retractable cores would have to be some 50 mm to 60 mm long and some 0.2 mm in diameter and have to be retracted axially along the length of the bending section body. Such long and thin cores would furthermore be prone to damage from the sideways closing mould parts and/or cross-wise cores closing in radial direction in order to form the hinges outside the passages if a high precision is not observed.

However, although the bending section presented in US Publication No. 2021/0393113 has many advantages, experience has shown that under certain circumstances the pull-wires, electrical wires, or optical fibres etc. accommodated in the passage may slip. That is to say, get dislocated from the passage provided by a lobe and the working channel tube, and wedge itself into the gap between the working channel tube and the circular wall part of the bending section body supporting the working channel tube. If slippage happens to a pull-wire, the bending performance of the bending section may be compromised.

SUMMARY

Based on this it is the object of the present disclosure to provide an endoscope with a bending section body that overcomes the above issues and allows for a good utilization of the limited space across the diameter of the bending section body.

According to the present disclosure this object is in a first aspect solved by an endoscope comprising an articulated bending section body, said articulated bending section body comprising a number of segments including a proximal end segment, a distal end segment and a number of intermediate segments arranged between the proximal segment and the distal segment, where a pair of end hinge members is provided between the proximal end segment and one of said intermediate segments, where a pair of end hinge members is provided between the distal end segment and one of said intermediate segments, and where a pair of intermediate hinge members is provided between any adjacent intermediate segments, at least some of said intermediate hinge members defining a longitudinal central plane of said articulated bending section body, where each intermediate segment has a central passage adapted in cross-sectional shape to receive and support the exterior surface of a bendable tubular member providing a working channel of the endoscope, where the cross-sectional shape comprises a number of sectors of a circular periphery having a shared center and the same radius, the total length of said sectors being longer than half of said circular periphery, so as to provide said support for the exterior of the bendable tubular member providing the working channel of the endoscope, and where said cross-sectional shape comprises at least one outwardly extending lobe in which a coil spring is accommodated.

In a second aspect the object is solved by a system comprising an endoscope according to the first aspect and a display unit connectable thereto.

Providing a coil spring in the lumen allows it to surround and serve as a guide member for the pull-wire, thereby preventing the guide wire from entering into the gap between the working channel tube and the circular wall part of the bending section body. At the same time the larger diameter of the coil spring surrounding the pull-wire prevents the coil spring itself from entering into the gap. Thus, the bending section body may still be injection moulded with the advantageous single central passage only. Furthermore, the introduction of coil springs in the lumens of the bending section provides a self-alignment of the bending section, i.e. a built-in bias towards a straight and aligned configuration of the bending section segments.

In an embodiment the coil spring defines a central passage accommodating and guiding a pull-wire. Being actively put under stress the pull-wires are far more prone to slippage then the other elements in passages such as electrical wires, optical fibres etc.

In an embodiment the coil spring extends from the proximal end segment to the distal end segment through the closed lumens of each intermediate segment. In this way, the coil spring also guides and protects the pull-wire between the individual segments, thereby giving the pull-wire a smooth curvature between segments when the bending section bends, in turn reducing the risk of the pull-wire starting to wedge itself into the gap where at the point where a segment ends. This in turn also protects the surrounding parts from the pull-wire. E.g. the pull-wire will not rub against the bending cover, i.e. the outer sleeve covering the bending section, during motion, and thus not cause any wear on the latter, such as pin-holes.

In an embodiment the coil spring is compressible. By using a compressible coil spring, i.e. a coil spring that is not tightly wound and therefore axially compressible, the coil spring may adapt its length when the bending section bends and thus not inhibit the bending.

In an embodiment, at least a part of the coil spring is incompressible. By making a part of the coil spring incompressible, the overall bending properties of the bending section may be controlled. In use, it is desirable that the distal end of the bending section bends more and before the proximal end. Providing a suitable incompressible section at the proximal end of the coil spring, e.g. by the coil spring being tightly wound, it will to some extent inhibit the bending, thereby allowing the distal end and other parts of the bending section to bend more and before the proximal end. It may of course also be possible to gradually vary the pitch over some parts of the length of the coils spring such that the compressibility varies and/or some parts get fully compressed before others. It may also be possible to provide tightly wound sections in order to make both the proximal and the distal end of the coil spring more firm and rigid in order to better control their proper positions where they are accommodated it the respective proximal and distal end segments of the bending section body. In any case, in an embodiment, the incompressible part of the coil spring provides the proximal end of the coil spring.

According to an embodiment, the coil spring is designed to allow a maximum compression of at least 10% preferably between 10% and 20%, most preferred approximately 13.5%. Depending on which type of endoscope the bending section body with the coil springs of the disclosure is implemented in, this will allow maximum compression to be achieved at maximum desired bending of the bending section, while at the same time preventing an oppositely arranged corresponding coil spring at the opposite, in that situation stretched, side of the bending section to become dislocated from the desired positions in their accommodations in the respective proximal and distal end segments.

In an embodiment, the coil spring is a steel spring. Steel springs are readily available at low cost and may easily be designed with desired compression properties.

BRIEF DESCRIPTION OF THE DRAWINGS

The disclosure will now be made in greater detail based on exemplary non-limiting embodiments and with reference to the drawings, on which.

DETAILED DESCRIPTION

Figure 10:
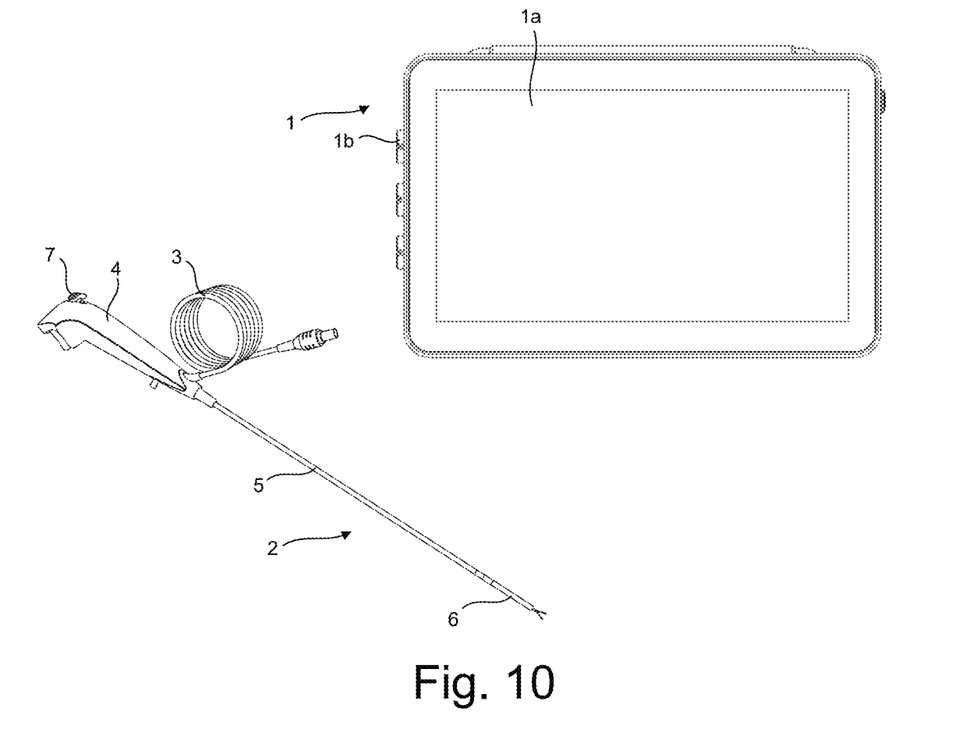
FIGS. 10 and 11 show a system comprising an endoscope according to the present disclosures connected to a display unit.
Figure 11:
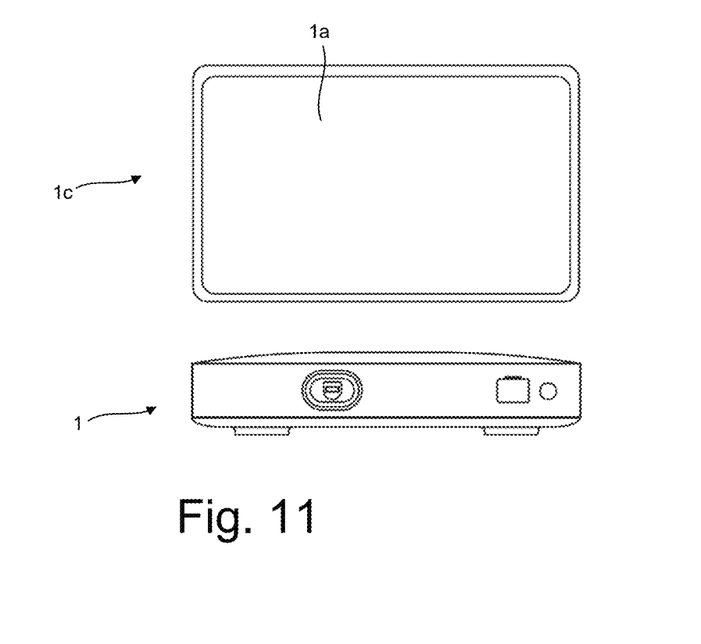

Turning first to FIGS. 10 and 11, a system comprising a video processing unit 1, 1c and an endoscope 2 according to the disclosure is shown. The endoscope 2 is connected to the video processing unit 1, 1c via a cable connection 3. The endoscope 2 and the video processing unit 1, 1c can also include transceivers to communicate images and configuration data wirelessly, for example via a wireless HDMI protocol. The system is operable to present live images generated by the endoscope with a display screen 1a. The video processing unit 1 is portable and includes the display screen 1a and several ports 1b to enable visualization from multiple endoscopes concurrently. The video processing unit 1c can be located in a convenient place where it does not interfere with medical procedures. It also has several ports and/or may also include transceivers to communicate wirelessly with the endoscopes or a separate video display 1c having the display screen 1a. The video processing unit 1c can also communicate with the video display 1c with an HDMI or other cable for transferring video.

The endoscope 2 comprises a proximal handle 4 to be gripped by a hand of an operator. From the handle 4 an insertion cord 5 insertable into a cavity, such as a body cavity, extends towards the distal end of the endoscope 2. At the distal end of the endoscope 2, a main insertion cord of the insertion cord is terminated in a bending section 6 comprising a number of articulated segments 8, 9, 14 (see FIG. 1) where the most distal segment 9 comprises, encloses, supports, or is associated with a camera housing 10. The handle 4 comprises a control lever 7, a knob or the like, which may be moved by a finger on the hand of the operator gripping the handle 4. Motion of the control lever 7 is transmitted to the most distal segment 9 of the bending section 6 via one or more pull-wires 11 (see FIG. 2) allowing the bending section 6 to bend in one or more directions, depending on the number of pull-wires 11. In the following examples and embodiments, the number of pull-wires 11 is two but other numbers such as one, three or four may also be implemented.

Figures 1, 2:
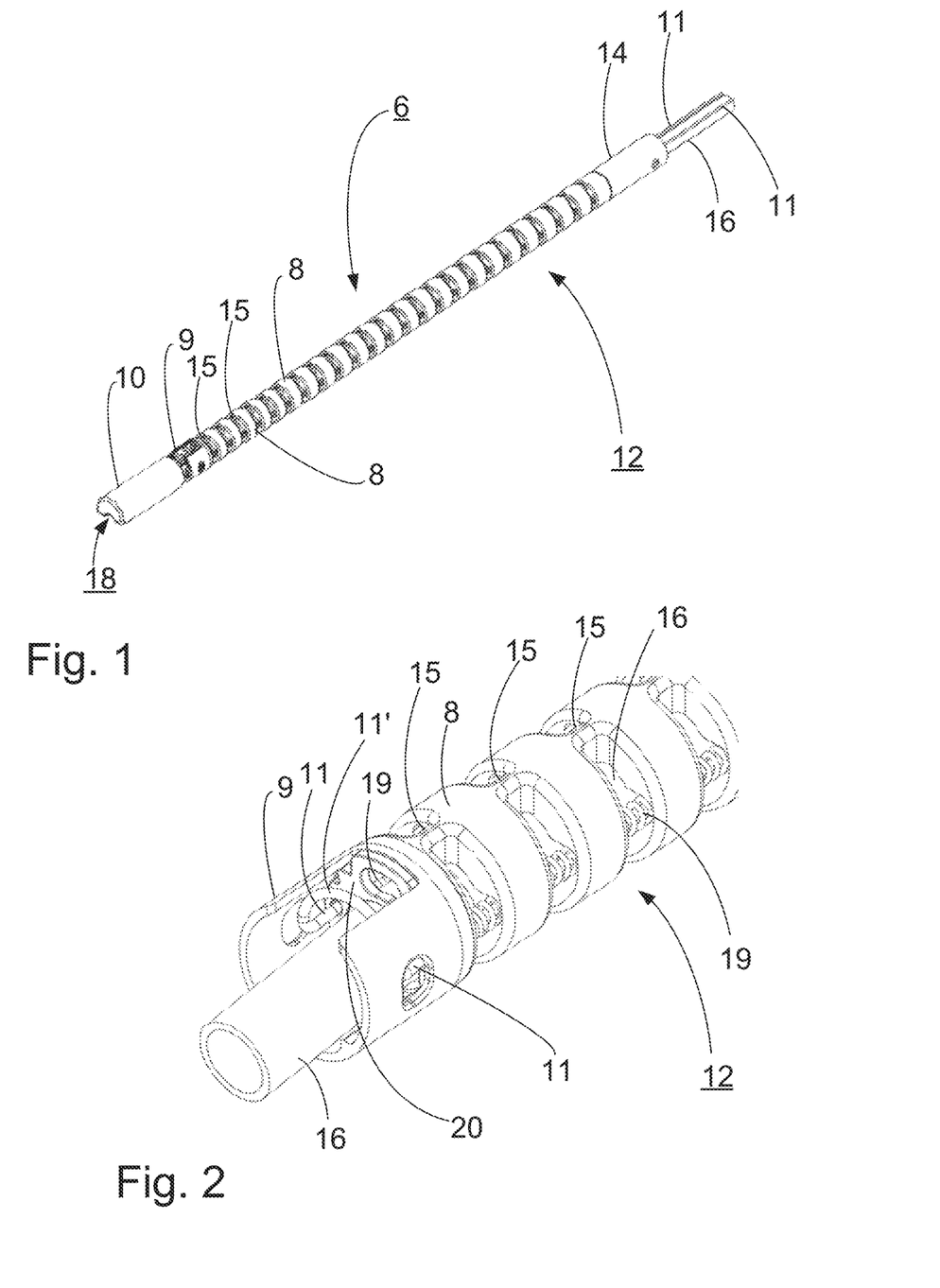
FIG. 1 shows the distal tip part of an endoscope with a bending section but with the outer sleeve removed for illustration purposes.
FIG. 2 shows details of the distal tip part of FIG. 1 including a part of the bending section body, but with the tip closing member and the camera housing removed for illustration purposes.

In FIG. 1 the bending section 6 forming the distal tip part of the endoscope 2 is shown in greater detail and with the outer sleeve removed for illustration purposes. The bending section 6 comprises a bending section body 12 comprising a number of segments 8, 9, 14, more specifically a distal end segment 9, a proximal end segment 14 and a number of intermediate segments 8. The segments 8, 9, 14 are connected in an articulated manner by means of suitable hinge members 15, such as foil hinges moulded integrally with the remainder of the bending section body 12. A bendable tubular member 16, e.g. a tube with an oval or circular periphery, providing a working channel of the endoscope 2 passes through a central passage 17 (see FIG. 4) provided in and by all of the segments 8, 9, 14 from the proximal end segment 14 to the distal end segment 9 to a distal exit port 18 provided in the camera housing 10. The camera housing 10 itself is preferably connected to, integrated in or otherwise forms a part of the distal end segment 9.

FIG. 2 shows a more detailed view of the distal part of the bending section body 12 with the camera housing 10 removed, along with a few other parts irrelevant for the disclosure. Here, a pull-wire 11 is visible. The pull-wire 11 has two portions extending from the distal end segment to the handle, and a bridge 11' between them. In this example the pull-wire is secured to the distal end segment by bending the pull-wire and placing the bridge distally of a proximal wall of the distal end segment. Alternatively, two pull-wires can be used, whose distal ends are secured to the distal end segment by potting, bonding, and/or bending the ends. Typically, the ends will be secured using an adhesive. For illustrative purposes when discussing the kinematic functionality of the pull-wire the term "pull-wires" will be used regardless whether it is two separate wires or two sections of a wire connected by the bridge.

Figure 3:
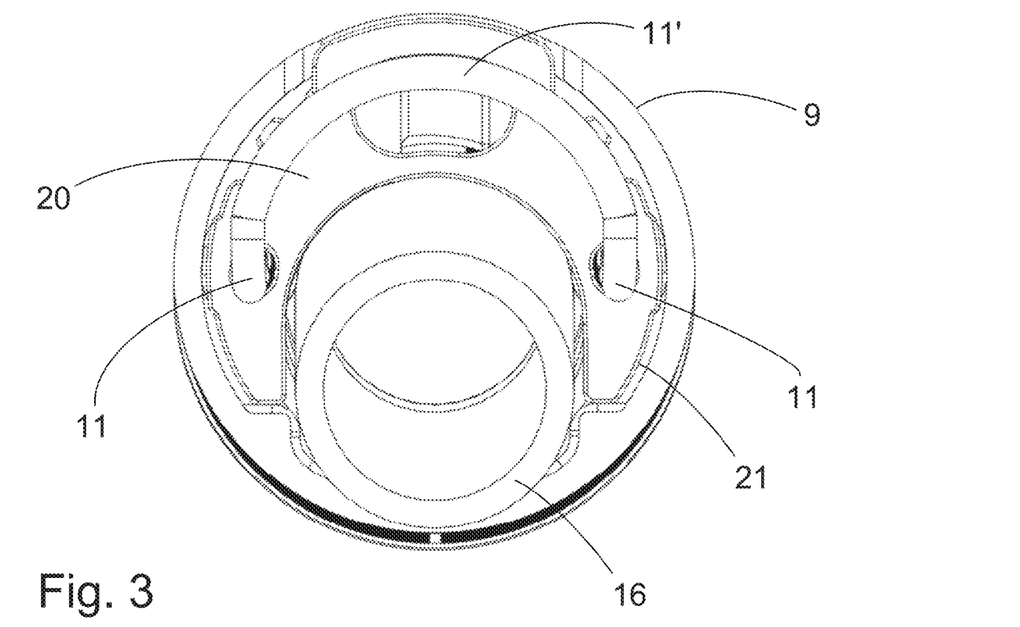
FIG. 3 shows an end view of the bending section as shown in FIG. 2.

In FIG. 2 it can also be seen that the endoscope 2 comprises two coil springs 19. These coil springs 19 each define a central coil passage 13 (best seen in FIG. 4) in which the pull-wires 11 are accommodated. The coil springs 19 are preferably made of common spring steel such as AISI 304 stainless steel. A termination bracket 20 arranged in the distal end segment 9 serves as an end stop for the coil springs 19, preventing them from entering too far into the distal end segment 9. The termination bracket 20 is better seen in FIG. 3. FIG. 3 is an end view corresponding to FIG. 2, i.e. comprising the same parts. Here it can be seen that the termination bracket 20 has a C- or horseshoe-shape with appropriate cut-outs for the pull-wires 11, electrical wires (not shown) and the flexible tube 16. The outer circumference 21 of the horseshoe-shape is adapted to the inner shape of the distal end segment 9.

Figure 4:
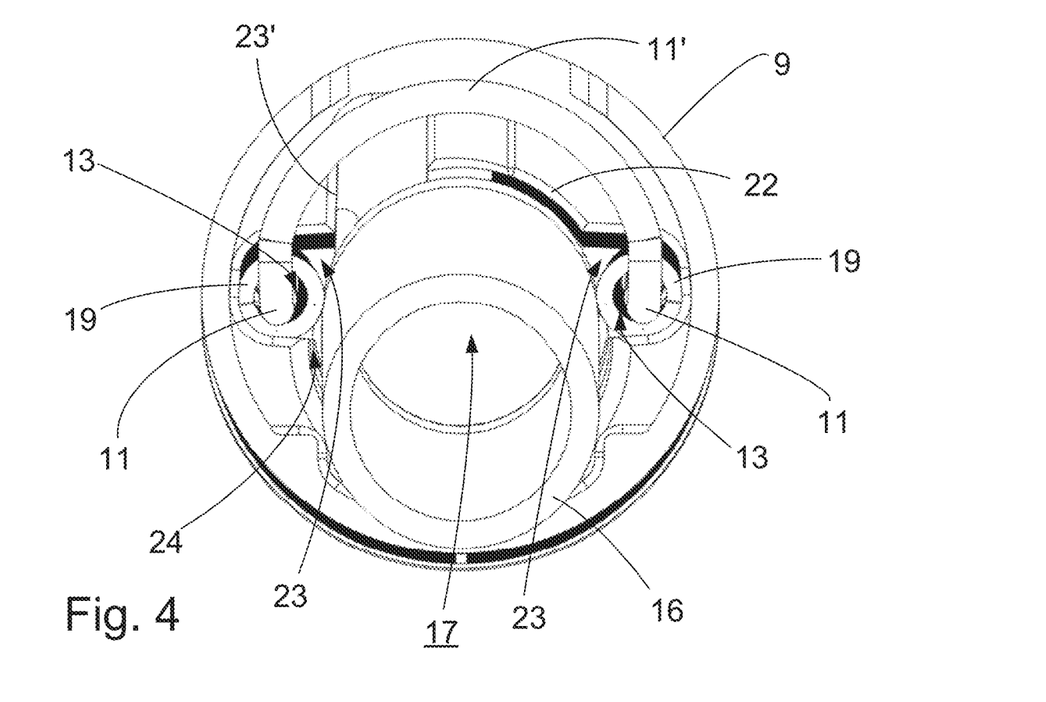
FIG. 4 shows an end view of the bending section as shown in FIG. 3, but with a closing plate member furthermore removed for illustration purposes.

In FIG. 4 the termination bracket 20 has been removed for better visibility of the central passage 17, which extends not only through the distal end segment 9, but essentially though each of the intermediate segments 8 and the proximal segment 14 too. The central passage 17 in cross-section comprises an essentially circular central part (shown as a dashed circle 22a in FIG. 5A) adapted in diameter to the outer diameter of the flexible tube 16, so as to accommodate and support the flexible tube 16 against e.g. kinking. The essentially circular central part 22a of each segment, formed by a number of sectors 22 of a circular periphery (described below), may be referred to as the "working channel tube passage" and in aggregate, considering all the segments with such an essentially circular central part, as the "working channel tube passages."

Figure 7:
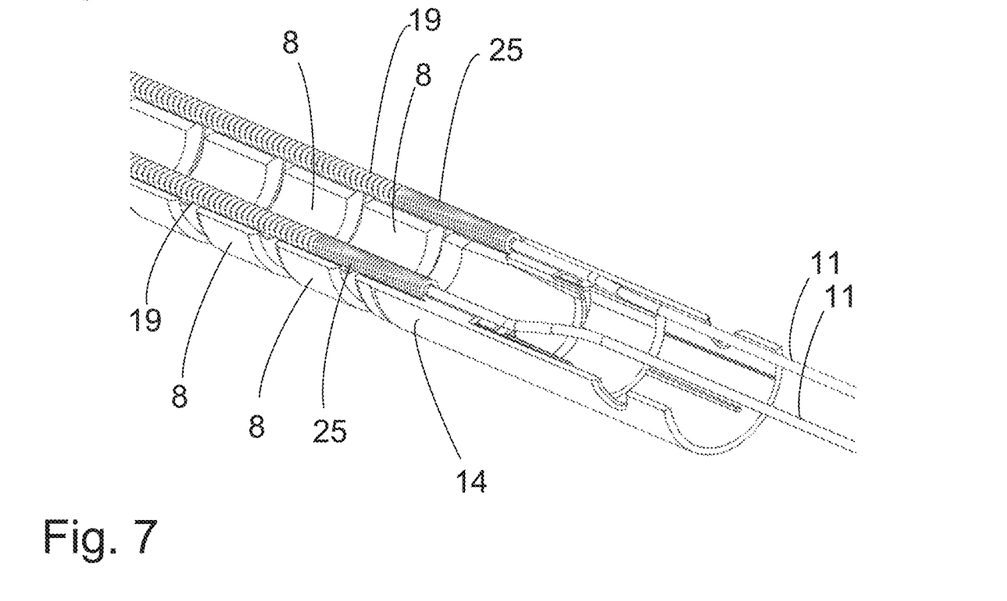
FIG. 7 shows a partial cross-section of the proximal end of the bending section body.

In cross-section, the central passage 17 furthermore comprises, in addition to the working channel tube passage, two lobes 23 accommodating coil springs 19 and pull wires 11. The exterior of the flexible tube 16 providing the working channel of the endoscope 2 forms an essentially closed lumen together with each of the two lobes 23 adjacent but separated from the working channel of the endoscope 2. Because the coil springs 19 extend through the bending section, portions 19a (FIG. 7) of the coil springs 19 are accommodated in the lobes 23 and portions 19b (FIG. 7) are visible between the segments, e.g. not accommodated in the coil springs 19.

Figure 5:
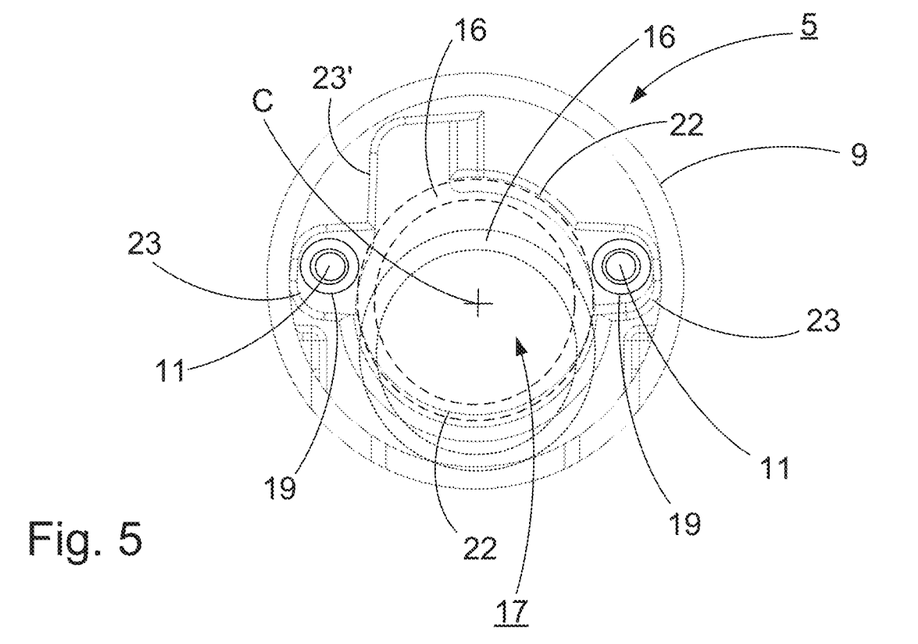
FIGS. 5 and 5A show an end view of the bending section.

As can better be seen in FIG. 5 the cross-sectional shape of the central passage 17 comprises a number of sectors 22 of a circular periphery having a shared center C and the same radius (the "working channel tube passage"), the total length of said sectors being longer than half of said circular periphery, so as to provide said support for the exterior of the bendable tubular member 16 providing the working channel of the endoscope 2. In FIG. 5 there are two sectors 22, one extending roughly 170 degrees between two the lobes 23 and another extending approximately between one lobe 23 and a further lobe 23' adapted for accommodating cables and the like (not shown).

Figure 5A:
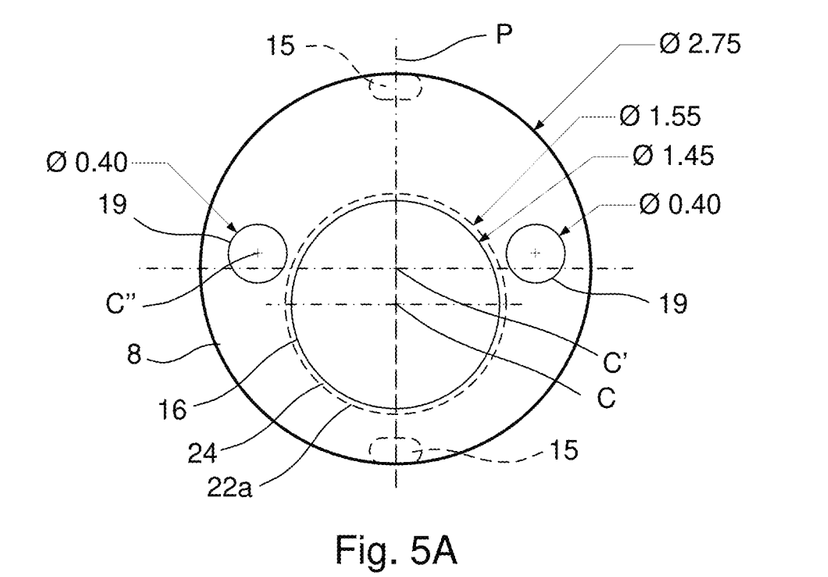

The coil springs 19 have an outer diameter sufficiently large to prevent them from entering any gap 24 that may exist between the working channel tube passage of the central passage 17 and the flexible tube, or could occur upon bending of the bending section 6, for the given rigidity of the flexible tube 16. In the illustrated example this criterion would be fulfilled if, according to a preferred embodiment, the flexible tube is made of a suitable polymer material, such as Pellethane 2363-65D TPU, and the dimensions are approximately as follows: Outer diameter of the segments 8, 9, 14: 2.75 mm. Outer diameter of the flexible tube 16: 1.45 mm. Inner diameter of circular part of the central passage 17: 1.55 mm. Wall thickness of the flexible tube 16: 0.10 mm. Pull-wire 11 diameter: 0.18 mm. Outer diameter of the stainless steel coil-springs 19: 0.40 mm: Central coil passage 13: 0.24 mm. These dimensions are shown in FIG. 5A, which is a schematic view of referenced components shown in FIG. 5, evidencing that FIG. 5 is to scale. Also shown, in dashed lines and not necessarily to scale as they are not shown in FIG. 5, are the hinges 15. A line P traversing the hinges 15 represents a bending plane. Also shown are the center C of the periphery of the circle, a center C' of the cross-sectional center of the bending section, and centers C" of the coil springs 19. The center C is below (offset along the bending plane) the center C' (lower in the page). The gap 24 is between the outer periphery of the flexible tube 16 and the essentially circular central part 22a.

Figure 6:
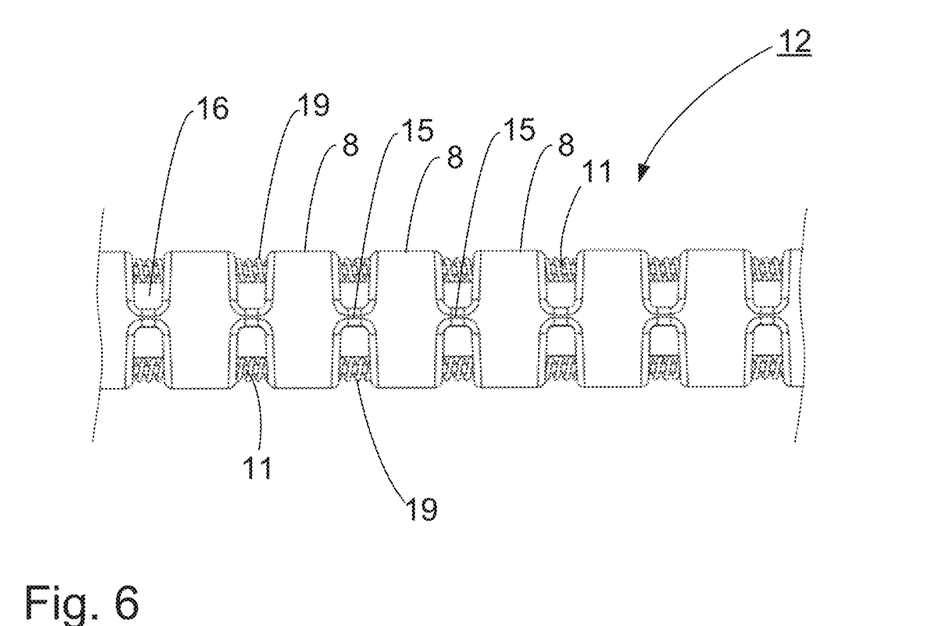
FIG. 6 shows a side view of a mid-section between the proximal end and the distal end of the bending section body.

A mid-section of the bending section body 12 is shown in side view with the segments 8 and the hinge members 15 interconnecting them easily visible. In the gaps between the segments 8, flexible tube 16 and the coil springs 19 are visible. As can be seen the coil springs 19 are not tightly wound and the spacing between the turns the pull-wires 11 can be seen. Because the coils springs 19 are not tightly wound they may compress in and between the proximal end segment 14 and the distal end segment 9 when the bending section body 12 bends and the distance that the pull-wire 11 follows between them in the bending section body 12 shortens. The coil springs 19 are preferably loosely held, i.e. their ends are not secured to the bending section body 12, so no expansion that might require additional application of force takes place. This, on the other hand, means that the proximal end and the distal end of each coil spring 19, cf. FIGS. 6 to 8 may slide with respect to any receptacle formed in the respective proximal end segment 14 or distal end segment 9.

To inter alia prevent the coils springs 19 to get caught on any edge of the receptacles, the proximal end and/or the distal ends of each coil spring is preferably tightly wound, i.e. with no spacing between the turns, and no compressibility under the forces occurring during use of the endoscope 2. Another reason for winding at least the proximal end of the coil springs 19 tightly is that the bending properties of the bending section 6 may thereby be influenced in an advantageous manner. More specifically, the general tendency of bending sections 6 with identical intermediate segments 8, of bending first at the proximal end segment 14 when the pull-wires 11 are pulled, can be countered. Being incompressible, at least one side of a coil spring 19 will resist further compression during bending, and additional force has to be applied in order to forcefully make and expand a gap between each turn on the opposite side of the coil spring 19. This resistance to bending suffices to make the bending section 6 initiate bending farther towards or at the distal end of the bending section 6, where a tight bending curvature is generally desired. As will be seen from comparison of FIGS. 7 and 8, the length of this incompressible bending resisting part may be varied from embodiment to embodiment, e.g. depending on the specific bending properties desired for a specific type of endoscope 2. The compressible part 27 between the tightly wound parts 25, 26 preferably has a constant pitch, i.e. the same spacing between the turns. It is, however, not excluded to have a varied pitch to even better influence the bending properties, but this makes the coil springs 19 slightly more complex in manufacturing.

The respective lengths of the tightly wound parts 25, 26 evidently depends on the overall length of the coil spring 19, which may itself vary in dependence of the intended use of the endoscope 2. In one preferred embodiment shown in FIG. 7 in a relaxed, as made, state, the coil spring 19 has the above-mentioned outer diameter of 0.40 mm and a central coil passage 13 of 0.24 mm. The overall length is 52.0 mm, i.e. approximately 130 times the outer diameter. The distal, tightly wound part 26 is 1.0 mm of the overall length and the proximal, tightly wound part 25 is 3.0 mm of the overall length, so that the intermediate compressible part 27 constituting the remainder is 48.0 mm. In relative terms that would say the distal, tightly wound part 26 constitutes approximately 2 percent of the overall length, the proximal, tightly wound part 25 constitutes approximately 6 percent of the overall length of the coil spring 19 whereas the uncompressed compressible intermediate part 27 constitutes approximately 73 percent of the overall length.

Figure 8:
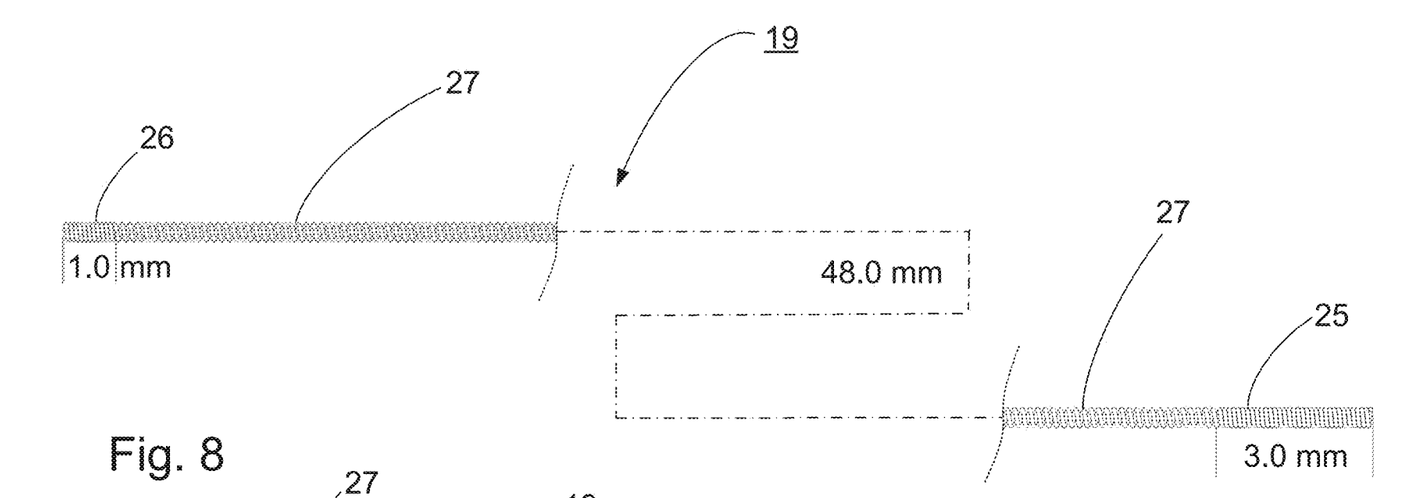
FIG. 8 shows a first embodiment of a coil spring accommodated in the bending section body.
Figure 9:
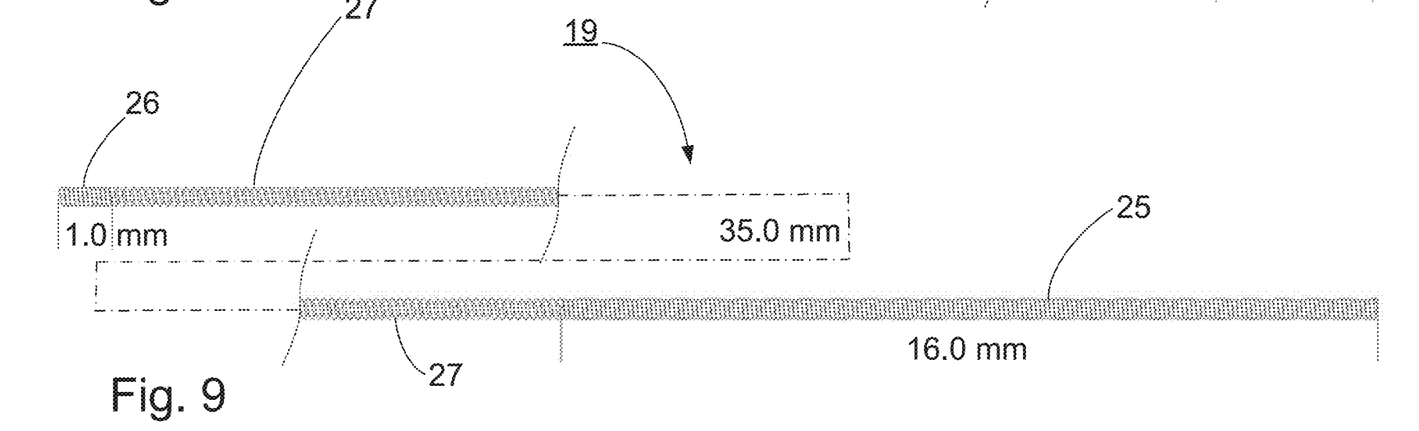
FIG. 9 shows a second embodiment of a coil spring accommodated in the bending section body.

In another preferred embodiment shown in FIG. 8 in a relaxed, as made, state, the coil spring 19 has also the above-mentioned outer diameter of 0.40 mm and a central coil passage 13 of 0.24 mm. The distal, tightly wound part 26 is 1.0 mm of the overall length and the proximal, tightly wound part 25 is 16.0 mm of the overall length, so that the intermediate compressible part 27 constituting the remainder is 35.0 mm. In relative terms that would say the distal, tightly wound part 26 constitutes approximately 2 percent of the overall length, the proximal, tightly wound part 25 constitutes approximately 31 percent of the overall length whereas the uncompressed compressible intermediate part 27 constitutes approximately 67 percent of the overall length.

It can of course also be envisaged that the proximal, tightly wound part 25 is only to serve the purpose of fitting in a receptacle as is the case for the distal, tightly wound part 26, in which case it could be shorter, in particular also only 1.0 mm, allowing the compressibility to be distributed over the remaining approximately 96 percent of the overall length. In other words, the proximal, tightly wound part 25 could constitute any length in the interval from approximately 2 percent to 31 percent, in particular anywhere in the interval from approximately 6 percent to 31 percent of the overall length. The higher end of the interval would ensure that the proximal end of the bending section 6 is less prone to bending than the distal end, so that the desired bending first occurs at the distal end, when the pull-wires 11 are pulled. Even longer lengths of incompressible coil parts could be envisaged, but given that in that case the compression is to be taken up over an increasingly shorter length of compressible coil spring 19, the pitch needed may be undesirably high, in view of the main purpose of preventing the pull-wires 11 and coil springs 19 from entering into the gap 24. In this respect it should be noted that the compression needed is preferably 7 mm or approximately 13.5 percent of the overall length, but maximum compressions in the range from approximately 10% to 20% have been found to be acceptable. If the maximum compression is too small the maximum bending of the bending section 6 allowable by the articulated segments 8, 9, 14 will not be reached.

The above relative lengths, diameters and compressions would also be applicable to other sizes of endoscopes.

Since endoscopes routinely use tightly wound coils as tubes for Bowden cables it can also be envisaged that the coil springs 19 described above merely constitute an appropriate length of such a Bowden tube coil at the distal end thereof, i.e. the distal end of the Bowden coil tube extending continuously through the insertion cord 5 all the way to the distal end segment 9 but comprising a non-tightly wound compressible part as described in the embodiments above arranged in the bending section.

Also, because the coil springs 19 provide the bending section with self-straightening properties the endoscope handle may be provided with braking or locking means operable by the operator using e.g. a knob or a lever if so desired.

The coil springs 19 can be tailored to different applications. In one example, the springs include lengths of compressed coil within the bending section. In another example, the springs have sections with different coil pitch. The springs have a fixed relationship to the handle. Therefore, it is also possible to provided different coils on each side to tailor the bending profile of the endoscope, particularly when the bending angle is not the same, e.g. an up bending angle different than a down bending angle. The coils can also be tailored to impart self-straightening properties to the bending section.

The endoscope can, except for the novel aspects disclosed, be assembled in a traditional manner. The bending section can be made by inserting a core in a mold cavity and then injecting a polymer. The central passage of the bending section allows formation of space for the pull-wires with a single core. The central passage allows passage of the pull-wires and the tubular member. Without the coil springs, the pull-wires, which are very thin, might slip between the periphery of the central passage and the tubular member. To prevent this, the coil springs are placed in the pull-wire lobes and, due to their larger diameter relative to the pull-wires, the coil springs cannot slip therebetween, facilitating assembly in addition to providing the aforementioned benefits. The pull-wires can be threaded through the coil springs before or after placement in the central passage. This enables manufacturing of small diameter insertion cords in an economical injection molding process.

The following items are examples of various embodiments disclosed above:

Item 1. An endoscope comprising an articulated bending section body, said articulated bending section body comprising a number of segments including a proximal end segment, a distal end segment and a number of intermediate segments arranged between the proximal segment and the distal segment,
  where a pair of end hinge members is provided between the proximal end segment and one of said intermediate segments,
  where a pair of end hinge members is provided between the distal end segment and one of said intermediate segments, and
  where a pair of intermediate hinge members is provided between any adjacent intermediate segments, at least some of said intermediate hinge members defining a longitudinal central plane of said articulated bending section body,
  where each intermediate segment has a central passage adapted in cross-sectional shape to receive and support the exterior surface of a bendable tubular member providing a working channel of the endoscope,
  where the cross-sectional shape comprises a number of sectors of a circular periphery having a shared center and the same radius, the total length of said sectors being longer than half of said circular periphery, so as to provide said support for the exterior of the bendable tubular member providing the working channel of the endoscope, and
  where said cross-sectional shape comprises at least one outwardly extending lobe in which a coil spring is accommodated.

Item 2. An endoscope according to item 1, wherein said coil spring defines a central passage accommodating and guiding a pull-wire.

Item 3. An endoscope according to any one of items 1 or 2, wherein said coil spring extends from the proximal end segment to the distal end segment through the closed lumens of each intermediate segment.

Item 4. An endoscope according to any one of the preceding items, wherein said coil spring is compressible.

Item 5. An endoscope according to any one of the preceding items, wherein at least a part of the coil spring is incompressible.

Item 6. An endoscope according to item 5, wherein the incompressible part of the coil spring provides the proximal end of the coil spring.

Item 7. An endoscope according to any one of items 4 to 6, wherein the coil spring is designed to allow a maximum compression of at least 10% preferably between 10% and 20%, most preferred approximately 13.5%.

Item 8. An endoscope according to any one of the preceding items wherein the coil spring is a steel spring.

Item 9. A system comprising an endoscope according to any one of the preceding items and a display unit connectable thereto.

LIST OF REFERENCE NUMERALS USED

1 Display unit
2 Endoscope
3 Cable connection
4 Handle
5 Insertion cord
6 Bending section
7 Control lever
8 Intermediate segments
9 Distal end segment
10 Camera housing
11 Pull-wires
12 Bending section body 13 Central coil passage
14 Proximal end segment
15 Hinge member
16 Flexible tube
17 Central passage
18 Distal exit port
19 Coil springs
20 Termination bracket
21 Outer circumference of horseshoe shape
22 Circular sector
23 Lobe
24 Gap
25 Proximal tightly wound part
26 Distal tightly wound part
27 Intermediate compressible part

What is claimed is:

1. An endoscope comprising:
a handle;
an insertion cord extending from the handle and including a bending section having segments including a proximal end segment, a distal end segment and intermediate segments arranged between the proximal end segment and the distal end segment, the segments connected to each other by hinge members and formed integrally therewith of a polymer material in one piece, each intermediate segment having a central passage and an outer periphery;
a tubular member extending through the central passages of the intermediate segments and providing a working channel of the endoscope;
a pull-wire; and
a coil spring, the pull-wire extending from the handle to the distal end segment and through a central passage of the coil spring,
wherein the central passage of at least some of the intermediate segments has a cross-sectional shape comprising sectors of a circle having a center and a periphery, each sector having a circumferential length, a sum of the circumferential lengths of the sectors being longer than half of the periphery of the circle, the sectors supporting an exterior of the tubular member,
wherein the cross-sectional shape comprises at least one lobe extending outwardly from the periphery of the circle, a diameter of the circle being small enough to position the at least one lobe between the periphery of the circle and the outer periphery,
wherein the at least one lobe comprises a length and accommodates a longitudinal portion of the coil spring, the longitudinal portion extending along the length and comprising an outer peripheral surface extending 360 degrees radially about the central passage of the coil spring, and
wherein the at least one lobe surrounds at least half of the outer peripheral surface of the longitudinal portion of the coil spring.

2. The endoscope of claim 1, wherein the coil spring extends from the proximal end segment to the distal end segment.

3. The endoscope of claim 2, wherein the coil spring is compressible.

4. The endoscope of claim 3, wherein the coil spring has a length and a maximum compression of at least 10% of the length.

5. The endoscope of claim 4, wherein the maximum compression is between 12% and 15%.

6. The endoscope of claim 5, wherein the maximum compression is 13.5+/−0.5%.

7. The endoscope of claim 1, wherein a part of the coil spring is compressible.

8. The endoscope of claim 7, wherein the coil spring comprises an incompressible part, and wherein the incompressible part of the coil spring is incompressible.

9. The endoscope of claim 8, wherein the incompressible part of the coil spring is located at a proximal end of the coil spring.

10. The endoscope of claim 8, wherein the incompressible part of the coil spring is located at a proximal end of the bending section extending distally from the proximal end segment.

11. The endoscope of claim 7, wherein the coil spring has a length and a maximum compression of at least 10% of the length.

12. The endoscope of claim 11, wherein the maximum compression at most 20%.

13. The endoscope of claim 12, wherein the maximum compression is between 12% and 15%.

14. The endoscope of claim 13, wherein the maximum compression is 13.5+/−0.5%.

15. The endoscope of claim 1, the endoscope further comprising a termination bracket arranged in a distal cavity of the distal end segment, wherein the termination bracket comprises an arcuate outer periphery, a cut-out for the tubular member, and a hole for the pull-wire to pass therethrough, the hole being small enough to prevent passage of the coil spring therethrough.

16. A system comprising the endoscope of claim 1 and a video processing unit connectable thereto to present live images generated by the endoscope with a display screen.

17. The system of claim 16, wherein the video processing unit includes the display screen.

18. The system of claim 16, wherein the video processing unit does not include a display screen and is adapted to communicate image data corresponding to the live images to a display device including a display screen.

19. The system of claim 16, wherein the endoscope and the video processing unit comprise wireless transceivers operable to transmit and receive, respectively, image data corresponding to the live images.

20. The endoscope of claim 1, wherein the at least one lobe comprises three lobes accommodated between the outer periphery and the circle, further comprising a second coil spring, the pull-wire comprising a first section, a second section, and a bridge portion connecting the first section and the second section, the first section extending from the handle to the distal end segment and through the central passage of the coil spring and the second section extending from the handle to the distal end segment and through the second coil spring, further comprising a termination bracket arranged in a distal cavity of the distal end segment, wherein the termination bracket includes a cut-out for the tubular member and two holes for the first section and the second section of the pull-wire to pass therethrough, the two holes being small enough to prevent passage of the coil spring and the second coil spring therethrough, the bridge portion of the pull wire positioned distally of the termination bracket.

21. The endoscope of claim 1, wherein the intermediate segments comprise walls extending from the outer periphery to the periphery of the circle, wherein the at least one lobe comprises three lobes, the at least three lobes comprising cut-outs in the walls.

22. The endoscope of claim 1, wherein the intermediate segments comprise walls extending from the outer periphery to the central passage, wherein the at least one lobe comprises three lobes comprising two coil spring passages and a third passage, and wherein the central passage comprises the three lobes and a working channel tube passage defined in part by the sectors of the circle.

23. The endoscope of claim 22, further comprising gaps between the tubular member and the sectors of the circle, wherein the gaps are smaller than a diameter of the coil spring to retain the coil spring in one of the two coil spring passages.

24. An endoscope comprising:
   a handle;
   an insertion cord extending from the handle and including a bending section having segments including a proximal end segment, a distal end segment and intermediate segments arranged between the proximal end segment and the distal end segment, the segments connected to each other by hinge members and formed integrally therewith of a polymer material in one piece, each intermediate segment comprising an outer periphery, a central passage, and a wall extending between the outer periphery and the central passage, the central passage comprising three lobes and a working channel tube passage, the three lobes comprising two coil spring passages and a third passage, each of the two coil spring passages comprising a length,
   a tubular member extending through the working channel tube passages of the intermediate segments and providing a working channel of the endoscope; and
   two coil springs positioned, respectively, through the two coil spring passages of the intermediate segments, each of the two coil springs comprising a central passage, each of the two coil spring passages accommodating a longitudinal portion of each, respectively, of the two coil springs, each of the longitudinal portions extending along the length of the respective one of the two soil spring passages and comprising an outer peripheral surface extending 360 degrees radially about the central passage of the coil spring, each of the coil spring passages surrounding at least half of the outer peripheral surface of the longitudinal portion it accommodates,
   wherein peripheries of the working channel tube passages extend around more than 50% of a circumference of the tubular member, and
   wherein gaps between the tubular member and the working channel tube passages are smaller than diameters of the two coil springs to retain the two coil springs in the two coil spring passages.

25. The endoscope of claim 24, wherein each of the two coil springs comprises an incompressible section and a compressible section distal of the incompressible section.

26. The endoscope of claim 25, wherein the compressible section comprises variable compressibility.

27. The endoscope of claim 1, wherein the tubular member comprises a bending section portion positioned within the bending section and comprising an outer surface devoid of recesses, and wherein the center of the periphery of the circle is offset along a bending plane from a cross-sectional center of the bending section.

* * * * *